United States Patent [19]
Takahashi et al.

[11] 3,984,373
[45] Oct. 5, 1976

[54] THERMOSETTING RESIN COMPOSITION

[75] Inventors: Akio Takahashi; Motoyo Wajima, both of Hitachi; Ritsuro Tada, Mito, all of Japan

[73] Assignee: Hitachi, Ltd., Japan

[22] Filed: Mar. 27, 1974

[21] Appl. No.: 455,408

[30] Foreign Application Priority Data
Mar. 28, 1973  Japan.................. 48-34568
Mar. 28, 1973  Japan.................. 48-34569

[52] U.S. Cl................ 260/47 EN; 260/45.8 N; 260/47 EC; 260/59 EP; 260/78 UA; 260/78 SC; 260/830 P; 260/DIG. 24; 428/417
[51] Int. Cl.²......................... C08G 30/14
[58] Field of Search ....... 260/47 EN, 47 EC, 326 R, 260/326 NS, 326 N, 326.26, 326.5, 78 UA, 78 SC, 830 P

[56] References Cited
UNITED STATES PATENTS
3,627,730  12/1971  Moran, Jr............................ 260/2 X
3,730,948  5/1973  Akiyama......................... 260/836 X
3,839,358  10/1974  Bargain.......................... 260/326.26

*Primary Examiner*—Murray Tillman
*Assistant Examiner*—T. Pertilla
*Attorney, Agent, or Firm*—Craig & Antonelli

[57] ABSTRACT

An epoxy resin composition containing an N,N'-unsaturated amic acid compound represented by the general formula, HOCO—R₂—CONH—R₁—Y, wherein R₁ is a divalent group having 2 or more carbon atoms, R₂ is a divalent group having a carbon-to-carbon double bond, and Y is

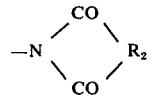

or —NHCO—R₂—COOH. The composition is characterized, by being favorable in curing characteristics, heat resistance, and flame retardance.

22 Claims, No Drawings

THERMOSETTING RESIN COMPOSITION

This invention relates to a novel thermosetting resin composition based on an epoxy resin, and, moree particularly, to a thermosetting resin composition having curing characteristics, and being excellent in thermal stability and flame retardance.

Polyimide resins are typical electrical insulating materials noted for their excellent thermal stability and flame retarding property and are obtained by thermally curing, for example, polyamic acids derived from polycarboxylic acids and diamines. They have, however, an important disadvantage of interior curability, requiring more than three hours of heating at a temperature of 250° to 400°C. for curing. Further, since their curing mechanism is based on dehydration ring-closure reaction producing amic acid imide rings, it is necessary to remove the volatile water, thus raising an operational problem. In order to solve the operational problem, there has been proposed an aminobismaleimide resin, which, however, also requires prolonged heating at a high temperature (24 hours at 250°C.). Moreover, such resins have another disadvantage in that they required more expensive starting materials than those used in popular epoxy resins.

An object of this invention is to provide a novel thermosetting resin composition, in which the economical problem has been solved and which is excellent in all of the thermal stability, curing characteristics, and flame retardance.

Another object of this invention is to provide a thermosetting resin composition based on an epoxy resin incorporated with an N,N'-unsaturated amic acid compound.

Other object and advantages of this invention will become apparent from the following description.

The N,N'-unsaturated amic acid for use in this invention is represented by the general formula, HOCO—R$_2$—CONH—R$_1$—Y, wherein R$_1$ is a divalent group having 2 to 30 carbon atoms R$_2$ is a divalent group having a carbon-to-carbon double bond, and Y is

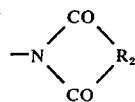

or —NHCO—R$_2$—COOH.

The N,N'-unsaturated amic acid amides represented by the formula,

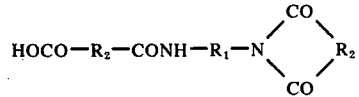

are 1-(maleamic acid)-2-maleimido-ethylene, 1-(maleamic acid)-6-maleimido-hexamethylene, 1(maleamic acid)-3-maleimido-phenylene, 1-(maleamic acid)-4-maleimido-phenylene, 4-(maleamic acid)-4'-maleimido 4-(maleamic acid)-4'-maleimido-diphenylether, 4-(maleamic acid)-4'-maleimido-diphenylsulfone, 4-(maleamic acid)-4'-maleimido]α,α'-[4-(malemic acid)-4'-maleimico]dimethylcyclohexane, 1-(maleamic acid)-3-maleimido-xylene, and the like. The amide group and carboxyl group in the amic acid may be in either trans- or cis-configuration.

The N,N'-unsaturated bisamic acids represented by the formula, HOCO—R$_2$—CONH—R$_1$—NHCO—R$_2$—COOH are N,N'-ethylene-bismaleamic acid, N,N'-hexamethylene-bis-maleamic acid, N,N'-m-phenylene-bismaleamic acid, N,N'-p-phenylene-bismaleamic acid, N,N'-4,4'-diphenylmethane-bismaleamic acid, N,N'-4,4'-diphenylether-bismaleamic acid, N,N'-4,4'-diphenylsulfone-bismaleamic acid, N,N'-4,4'-dicyclohexylmethane-bismaleamic acid, N,N'-α,α'-4,4'-dimethylenecyclohexane-bismaleamic acid, N,N'-m-xylene-bismaleamic acid, N,N'-diphenylcyclohexane-bismaleamic acid, etc. The amide group and carboxyl group of the amic acid may be in either trans- or cis-configuration.

In mixing with an epoxy resin, these N,N'-unsaturated amic acid compounds may be used alone or in combination of two or more.

The epoxy resins to be used are those having in the molecule more than one vicinal epoxy group on average, such as, for example, bisphenol A type epoxy resins which are condensation products of bisphenol A and epichlorohydrin, resorcinol-type epoxy resins, tetrahydroxyphenylethane-type epoxy compounds having the formula,

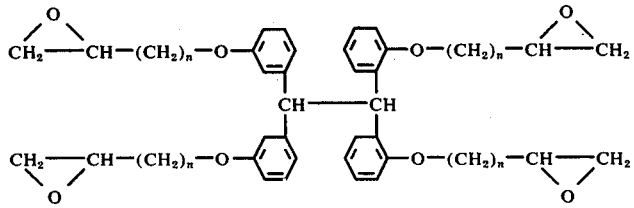

where n is greater than 1, novolac-type epoxy resins, cycloaliphatic-type epoxy resins, and halogenation products of these resins.

These epoxy resins harden by chemical reaction between their epoxy groups and the amide hydrogen atoms of the above-noted unsaturated amic acid compounds. The latter compounds are added to the epoxy resins in equivalent amounts, that is to say, 30 to 200 parts by weight of the compound per 100 parts by weight of the epoxy resin. Although such a two-component system can yield a cured product suitable for practical uses, it is preferable to add to the system a polycarboxylic acid anhydride curing agent or an amine-type curing agent which is usually used as a means to cure epoxy resins. The amount of such a curing agent to be used is similar to that used in customary epoxy resin compositions. In the case of this invention, since the unsaturated amic acid compound functions also as a curing agent for an epoxy resin (this means also that an epoxy resin functions as a curing agent for the unsaturated amic acid compound), it is also possible to reduce the amount of curing agent compared with the case of customary epoxy resin compositions.

The curing agents include polycarboxylic acid anhydrides such as maleic anhydride, dichloromaleic anhydride, dodecenylsuccinic anhydride, pyromellitic anhydride, phthalic anhydride, methylendomethylenetetrahydrophthalic anhydride, methyltetrahydrophthalic anhydride, hexachloroendomethylenetetrahydrophthalic anhydride, benzophenonetetracarboxylic anhydride, and the like; amine compounds such as 4,4'-methylenebis-(2-chloroaniline), 4,4'-methylenebis(2,3-dichloroaniline), 4,4'-methylenebis(2,5-dichloroaniline), dicyandiamide, 3,3'-diaminodiphenyl sulfone, m-phenylenediamine, 4,4'-diaminodiphenylmethane, diethylaniline, 4,4'-diaminodiphenylmethane, ethylenediamine, diethylenetriamine, triethylenetetramine, tetraethylenepentamine, and the like; and tertiary amine compounds, boron trifluoride, various complexes, etc.

Although the essential components of the present thermosetting resin composition consist of at least one member of the aforesaid unsaturated amic acid compounds and an epoxy resin, it is possible to apply to the composition various techniques which have been in general use in the field of epoxy resin technology, including addition of curing agent and other additives such as, for example, flame retardants, fillers, etc.

Owing to the unsaturated amic acid compound the cured product obtained from the essential components of this invention is superior in flame retardance to that obtained from ordinarry epoxy resins along (excluding those which have been endowed with flame retarding property, such as halogenated epoxy resins). In this invention, it is, of course, possible to use also a halogenated epoxy resin or to add a flame retardant to the composition. As one of the flame retardants, there may be used an N,N'-unsaturated bismaleimide which is a compound analogous to the aforesaid unsaturated amic acid compound and represented by the general formula

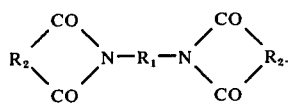

Examples of N,N'-unsaturated bismaleimide include N,N'-hexamethylene-bismaleimide, N,N'-m-phenylene-bismaleimide, N,N'-p-phenylene-bismaleimide, N,N'-4,4'-diphenylmethane-bismaleimide, N,N'-diphenylsulfone-bismaleimide, N,N'-4,4'-dicyclohexylmethane-bismaleimide, N,N'-α,α'-4,4'-dimethylenedicyclohexane-bismaleimide, N,N'-m-xylene-bismaleimide, N,N'-diphenylcyclohexane-bismaleimide, and the like. The unsaturated bismaleimide does not react with an epoxy resin, but undergoes ring scission polymerization to form a three-dimensional structure. The ring scission takes place at the unsaturated bond of the unsaturated bismaleimide and the compound undergoes radical polymerization according to the following scheme:

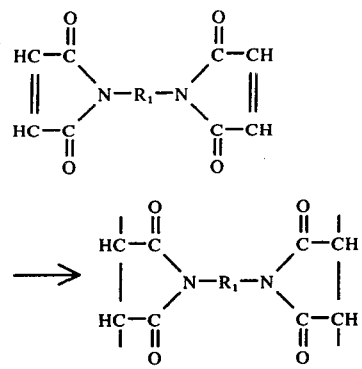

On the other hand, the carboxyl group and the amide group in the unsaturated amic acid imide combine with the epoxy group in the epoxy compound through addition reaction, while the unsaturated bond is subjected to ring scission through which radical polymerization is caused. Such ring scission polymerization of both unsaturated bisimide and unsaturated amic acid imide, as well as addition reaction between an amic acid imide and an epoxy compound yield a thermally stable epoxyimide resin.

It has been known that an aminobismaleimide-type resin obtained by adding an amine to the unsaturated group of an unsaturated bisimide reacts with an epoxy resin upon heating. In this case, however, the epoxy group of the epoxy resin reacts only with the amine group and, no radical polymerization of the unsaturated bisimide takes place. To the contrary, in this invention, the unsaturated groups of the unsaturated amic acid imide and of the unsaturated bisimide are in a free state susceptible to radical polymerization, and the epoxy group reacts also with the amide group, thus resulting in a cured product having a high crosslinkage density. This seems to be the reason for the formation of a cured product having a high thermal stability.

This invention is further explained below referring to Examples which are not by way of limitation but by way of illustration. In the Examples, parts are by weight unless otherwise specified.

EXAMPLE 1

| | |
|---|---|
| N,N'-4,4'-Diphenylmethane-bismaleamic acid | 50 parts |
| Cresol-novolac-type epoxy resin (ECN-1280, CIBA CO., U.S.A.; epoxy equivalent, 233) | 50 parts |

The above two components were dry-blended to obtain a resin composition of this invention. The composition was cured by heating at 180°C. for 90 minutes. The weight loss on heating and the temperature at the beginning of weight decrease of the cured product were as shown in Table 1.

EXAMPLE 2

| | |
|---|---|
| N,N'-4,4'-(diphenyl ether)-bismaleamic acid | 55 parts |
| Phenol-novolac-type epoxy resin (DEN-438, Dow Chemical Co., U.S.A.; epoxy equivalent, | 50 parts |

180. liquid resin)

A resin composition was obtained from the above components in a manner similar to that in Example 1.

Table 1

|  |  | Example No. | |
|---|---|---|---|
|  |  | 1 | 2 |
| Gel time at 180°C. (sec.) |  | 150 | 170 |
| Curing | Temperature (°C.) | 180 | 180 |
| conditions | Time (min.) | 90 | 100 |
| Temp. at beginning of wt. decrease (°C.) |  | 400 | 395 |
| Loss on heating at 500°C. (%) |  | 23 | 25 |
|  | 100°C. | 100 | 100 |
| Flexural strength* | 150°C. | 90 | 85 |
| (%) | 180°C. | 82 | 78 |
|  | 250°C. | 60 | 51 |

*Characteristic of laminated plates manufactured in the same manner as in Example 8 set forth hereinafter.

EXAMPLE 3

| Amic acid imide + bisamic acid + epoxy resin | |
|---|---|
| 4-(Maleamic acid)-4'-maleimido-diphenylmethane | 40 parts |
| N,N'-4,4'-Diphenylmethane-bismaleamic acid | 20 parts |
| ECN-1280 (cresol-novolac-type epoxy resin) | 50 parts |

The above three components were dry-blended to obtain a resin composition of this invention.

EXAMPLE 4

| Amic acid imide + bisamic acid + epoxy resin + curing agent | |
|---|---|
| 4-(Maleamic acid)-4'-maleimido-diphenyl sulfone N,N'-4,4'-(diphenyl sulfone)-bismaleamic acid | 60 parts |
| Tetrafunctional polyglycidyl ether-type epoxy resin (Epikote 1031, Shell Chemical Co., U.S.A.; epoxy equivalent, 210 – 240) | 50 parts |
| 4,4'-Diaminodiphenyl ether | 10 parts |

The above four components were dry-blended to obtain a resin composition of this invention.

EXAMPLE 5

| Amic acid imide + curing agent + epoxy resin | |
|---|---|
| 4-(Maleamic acid)-4'-maleimido-diphenyl ether | 60 parts |
| ECN-1280 | 40 parts |
| 4,4'-Methylenebis(2-chloroaniline) | 10 parts |

The above three components were dry-blended to obtain a resin composition of this invention.

EXAMPLE 6

| Amic acid imide + epoxy resin | |
|---|---|
| 4-(Maleamic acid)-4'-maleimido-diphenylmethane | 70 parts |
| DEN-438 (phenol-novolac-type epoxy resin) | 30 parts |

The above two components were blended to obtain a resin composition of this invention.

EXAMPLE 7

| Bisamic acid + curing agent + epoxy resin | |
|---|---|
| N,N'-4,4'-Diphenylmethane-bismaleamic acid | 60 parts |
| ECN-1280 | 40 parts |
| 4,4'-Methylenebis(2-chloro-aniline) | 5 parts |

The above three components were dry-blended to obtain a resin composition of this invention.

Curing characteristics of the compositions obtained in the foregoing Examples and characteristic properties of the cured products obtained therefrom were as shown in Table 2.

Table 2

|  |  | Example No. | | | | |
|---|---|---|---|---|---|---|
|  |  | 1 | 2 | 3 | 4 | 5 |
| Gel time at 180°C. (sec.) |  | 160 | 100 | 110 | 200 | 115 |
| Curing conditions | Temperature (°C.) | 180 | 180 | 120, 180 | 180 | 120, 180 |
|  | Time (min.) | 90 | 70 | 10, 90 | 200 | 30, 100 |
| Temp. at beginning of weight decrease (°C.) |  | 400 | 405 | 395 | 410 | 380 |
| Loss on heating at 500°C. (%) |  | 28 | 25 | 35 | 22 | 37 |
| Flexural strength*(%) | 100°C. | 100 | 100 | 100 | 100 | 100 |
|  | 150°C. | 90 | 91 | 85 | 90 | 80 |
|  | 180°C. | 83 | 85 | 70 | 81 | 64 |
|  | 250°C. | 61 | 63 | 45 | 60 | 45 |
| Flexural strength after degradation* (%) | 500 hrs. | 100 | 100 | 100 | 100 | 100 |
|  | 1000 hrs. | 95 | 93 | 90 | 92 | 90 |
|  | 1500 hrs. | 75 | 80 | 71 | 78 | 65 |
|  | 2000 hrs. | 63 | 65 | 65 | 70 | 55 |
| Oxygen index* |  | 70 | 68 | 85 | 85 | 76 |
| Water absorption in boiling water* (%) |  | 0.25 | 0.26 | 0.30 | 0.33 | 0.24 |

*Characteristics of laminated plates manufactured in the same manner as in Example 8 set forth below.

EXAMPLE 8

| N,N'-4,4'-Diphenylmethane-bismaleimide | 30 parts |
|---|---|
| N,N'-4,4'-Diphenylmethane-bismaleamic acid | 20 parts |
| Cresol-novolac-type epoxy | |

-continued

| | |
|---|---|
| resin (ECN-1280) | 50 parts |

The above three components were dry-blended to obtain a resin composition of this invention. The loss on heating and the temperature at the beginning of weight decrease of the cured product obtained by heating the said composition at 180°C. for 60 minutes were as shown in Table 3.

The above-mentioned resin composition was dissolved in 100 parts of N-methylpyrrolidone to prepare a varnish of a solids content of 50 %. A piece of glass cloth treated with aminosilane was impregnated with said varnish and dried at 100°C. for 40 minutes to prepare a prepreg. Eight plies of the prepreg were laminated at 180°C for 60 minutes under a pressure of 30 kg/cm$^2$ to obtain a laminated plate, 1.5 mm in thickness. The thermal characteristics and other properties of the laminated sheet were as shown in Table 3.

In Examples 9 – 12, the same procedure as in Example 8 was repreated, and the results obtained were as shown in Table 3. Accordingly, only resin formulations are shown below.

EXAMPLE 9

| | |
|---|---|
| N,N'-4,4'-(Diphenyl ether)-bismaleimide | 30 parts |
| N,N'-4,4'-(Diphenyl ether)-bismaleamic acid | 25 parts |
| Phenol-novolac-type epoxy compound (DEN-438) | 50 parts |

The above three components were blended to obtain a composition of this invention.

EXAMPLE 10

| | |
|---|---|
| N,N'-4,4'-(Diphenyl sulfone)-bismaleimide | 30 parts |
| N,N'-4,4'-(Diphenyl sulfone)-bismaleamic acid | 20 parts |
| Cresol-novolac-type epoxy compound (ECN-1280) | 50 parts |

The above three components were dry-blended to obtain a resin composition of this invention.

EXAMPLE 11

| | |
|---|---|
| N,N'-4,4'-Diphenylmethane-bismaleimide | 40 parts |
| N,N'-4,4'-Diphenylmethane-bismaleamic acid | 10 parts |
| Cresol-novolac-type epoxy compound (ECN-1280) | 50 parts |
| 4,4'-Diaminodiphenylmethane | 10 parts |

The above four components were dry-blended to obtain a resin composition of this invention.

EXAMPLE 12

| | |
|---|---|
| N,N'-4,4'-(Diphenyl ether)-bismaleimide | 50 parts |
| N,N'-4,4'-(Diphenyl ether)-bismaleamic acid | 15 parts |
| Cresol-novolac-type epoxy compound (ECN-1280) | 70 parts |
| Phthalic anhydride | 15 parts |

The above four components were dry-blended to obtain a resin composition of this invention.

For comparison, properties of a conventional epoxy-type laminated plate indicated as "Epoxy" and an N,N'-aminobismaleimide-type laminated plate indicated as "Imide" were also shown in Table 3.

Table 3

| | | Example No. | | | | | Comparative Examples | |
|---|---|---|---|---|---|---|---|---|
| | | 8 | 9 | 10 | 11 | 12 | Epoxy | Imide |
| Gel time at 180°C. (sec.) | | 100 | 110 | 150 | 80 | 90 | 120 | 260 |
| Curing conditions | Temperature (°C.) | 180 | 180 | 180 | 180 | 180 | 170 | 250 |
| | Time (min.) | 60 | 60 | 90 | 40 | 60 | 60 | 1440 |
| Temp. at beginning of weight decrease (°C.) | | 405 | 400 | 405 | 405 | 400 | 340 | 405 |
| Loss on heating at 500°C. (%) | | 22 | 25 | 23 | 20 | 25 | 65 | 20 |
| Flexural strength (%) | 100°C. | 100 | 100 | 100 | 100 | 100 | 70 | 100 |
| | 150°C. | 95 | 92 | 93 | 96 | 90 | 45 | 95 |
| | 180°C. | 85 | 83 | 84 | 88 | 80 | — | 90 |
| | 250°C. | 64 | 62 | 63 | 67 | 60 | — | 70 |
| Flexural strength after degradation (%) | 500 hrs. | 100 | 100 | 100 | 100 | 100 | — | 85 |
| | 1000 hrs. | 95 | 93 | 95 | 96 | 92 | — | 70 |
| | 1500 hrs. | 86 | 82 | 83 | 88 | 78 | — | 70 |
| | 2000 hrs. | 68 | 64 | 65 | 70 | 60 | — | 65 |
| Oxygen index | | 70 | 66 | 65 | 70 | 66 | 50 | 100 |
| Water absorption in boiling water (%) | | 0.22 | 0.23 | 0.24 | 0.24 | 0.20 | 0.23 | 0.65 |

Note:
Flexural strength (%):
Percentage retention of flexural strength at specified temperatures, based on the strength at 25°C.
Flexural strength after degradation (%):
Percentage retention of flexural strength measured at 180°C. after heating in air at 240°C. for a predetermined time interval, based on the initial strength.
Water absorption in boiling water (%): JIS K 6911

As is apparent from Table 3, the present resin compositions were comparable in characteristic properties and superior in curing characteristics to an imide-type resin.

EXAMPLE 13

| | |
|---|---|
| N,N'-4,4'-Diphenylmethane- | |

| | |
|---|---|
| bismaleimide | 30 parts |
| 4-(Maleamic acid)-4'-maleimido-diphenylmethane | 20 parts |
| Cresol-novolac-type epoxy compound (ECN-1280) | 50 parts |
| 4,4'-Diaminodiphenylmethane-(amine-type curing agent) | 10 parts |

The above four compounds were dry-blended to obtain a resin composition of this invention.

The loss on heating and the temperature at the beginning of weight decrease were measured on a cured product obtained by heating the resin composition at 180°C. for 40 minutes and found that under a nitrogen stream, the temperature at the beginning of weight decrease was 400°C. and the loss on heating at 500°C. was 25 %. The oxygen index, which is a barometer for the flame retardance, was 65 % (an oxygen index of 100 % means complete incombustibility).

EXAMPLE 14

| | |
|---|---|
| N,N'-4,4'-Diphenylmethane-bismaleimide | 10 parts |
| 4-(Maleamic acid)-4'-maleimido-diphenylmethane | 40 parts |
| Cresol-novolac-type epoxy compound (ECN-1280) | 40 parts |

The above three compounds were dry-blended to obtain a resin composition of this invention.

The loss on heating and the temperature at the beginning of weight decrease were measured on a cured product obtained by heating the resin composition at 180°C. for 60 minutes and found that under a nitrogen stream, the temperature at the beginning of weight decrease was 405°C. and the loss on heating at 500°C. was 22 %.

EXAMPLE 15

| | |
|---|---|
| N,N'-4,4'-(Diphenyl ether)bismaleimide | 20 parts |
| 4-(Maleamic acid)-4'-maleimido-diphenyl ether | 30 parts |
| Phenol-novolac-type epoxy compound (DEN-438) | 30 parts |

The above three compounds were blended to obtain a resin composition of this invention.

The loss on heating and the temperature at the beginning of weight decrease were measured on a cured product obtained by heating the resin composition at 180°C. for 60 minutes and found that under a nitrogen stream, the temperature at the beginning of weight decrease was 400°C. and the loss on heating at 500°C. was 20 %. The oxygen index was 70 %.

EXAMPLE 16

| | |
|---|---|
| N,N'-4,4'-(Diphenyl ether)-bismaleimide | 20 parts |
| 4-(Maleamic acid)-4'-maleimido-diphenyl ether | 30 parts |
| Phenol-novolac-type epoxy compound (DEN-438) | 50 parts |
| 4,4'-Diaminodiphenyl ether | 10 parts |

The above four compounds were blended to obtain a resin composition of this invention.

The loss on heating and the temperature at the beginning of weight decrease were measured on a cured product obtained by heating the resin composition at 180°C. for 40 minutes and found that under a nitrogen stream, the temperature at the beginning of weight decrease was 395°C. and the loss on heating at 500°C. was 25 %. The oxygen index was 65 %.

EXAMPLE 17

| | |
|---|---|
| N,N'-4,4'-Diphenylmethane-bismaleimide | 20 parts |
| 4-(Maleamic acid)-4'-maleimido-diphenylmethane | 20 parts |
| Cresol-novolac-type expoxy compound (ECN-1280) | 70 parts |
| N,N'-4,4'-Diphenylmethane-bismaleamic acid | 20 parts |

The above four compounds were blended to obtain a resin composition of this invention.

The loss on heating and the temperature at the beginning of weight decrease were measured on a cured product obtained by heating the resin composition at 180°C. for 60 minutes and found that under a nitrogen stream, the temperature at the beginning of weight decrease was 405°C., and the loss on heating at 500°C. was 25 %. The oxygen index was 68 %.

EXAMPLE 18

| | |
|---|---|
| N,N'-4,4'-Diphenylmethane-bismaleimide | 50 parts |
| 4-(Maleamic acid)-4'-maleimido-diphenylmethane | 10 parts |
| Cresol-novolac-type epoxy compound (ECN-1280) | 70 parts |
| N,N'-4,4'-Diphenylmethane-bismaleamic acid | 10 parts |
| Phthalic anhydride | 15 parts |

The above five compounds were dry-blended to obtain a resin composition of this invention.

The loss on heating and the temperature at the beginning of weight decrease were measured on a cured product obtained by heating the resin composition at 180°C. for 60 minutes and found that under a nitrogen stream, the temperature at the beginning of weight decrease was 400°C. and the loss on heating at 500°C. was 30 %. The oxygen index was 65 %.

EXAMPLE 19

| | |
|---|---|
| N,N'-4,4'-Diphenylmethane-bismaleimide | 50 parts |
| 4-(Maleamic acid)-4'-maleimido-diphenylmethane | 10 parts |
| Cresol-novolac-type epoxy compound (ECN-1280) | 70 parts |
| N,N'-4,4'-Diphenylmethane-bismaleamic acid | 10 parts |
| 4,4'-Diaminodiphenylmethane | 12 parts |

The above five compounds were dry-blended to obtain a resin composition of this invention.

The loss on heating and the temperature at the beginning of weight decrease were measured on a cured product obtained by heating the resin composition at 180°C. for 40 minutes and found that under a nitrogen stream, the temperature at the beginning of weight decrease was 405°C. and the loss on heating at 500°C. was 20 %. The oxygen index was 68 %.

EXAMPLE 20

Each of the resin compositions of Examples 13, 14, 15, 17 and 19 was dissolved in N-methylpyrrolidone to prepare a varnish of a solids content of 50 %. A piece of glass cloth treated with aminosilane was impregnated with the varnish and dried at 100°C. for 40 minutes to prepare a prepreg. Eight plies of the prepreg were overlaid on both sides with copper foils and pressed under application of heat and pressure, to obtain a copper-clad laminated plate, 1.4 to 1.6 mm in thickness. The peel strength of the laminated plate was 1.5 to 1.8 kg/cm, a value favorably comparable to that of a laminate obtained from a conventional epoxy resin prepreg.

The temperature dependency of flexural strength of the laminated plate without the copper foil was measured and the results obtained were as shown in Table 4. The degradation characteristics of the laminate were as shown in Table 4 in terms of percentage retention of the initial flexural strength. In Table 4, there are also shown characteristics of a conventional epoxy-type laminated plate indicated as "Epoxy" and of a conventional N,N'-aminobismaleimide-type laminated plate indicated as "Imide", for comparison.

wherein $R_1$ is a divalent group having 2 to 30 carbon atoms and $R_2$ is a divalent group having a carbon-to-carbon double bond and containing two carbon atoms, an unsaturated bisamic acid represented by the general formula, $$HOCO-R_2-CONH-R_1-NHCO-R_2-COOH,$$

wherein $R_1$ and $R_2$ have the same meanings as defined above, and an unsaturated bismaleimide represented by the general formula,

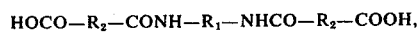

wherein $R_1$ and $R_2$ have the same meanings as defined above.

2. A thermosetting resin composition according to claim 1, in which further comprises a polycarboxylic acid anhydride as a curing agent.

3. A thermosetting resin composition comprising an epoxy resin having more than one vicinal epoxy group in the molecule, an N,N'-bismaleic amic acid imide represented by the general formula,

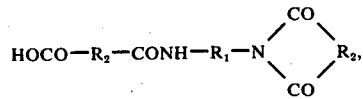

Table 4

| | Example No. | | | | | Comparative Examples | |
|---|---|---|---|---|---|---|---|
| | 13 | 14 | 15 | 17 | 19 | Epoxy | Imide |
| Gel time at 180°C. (sec.) | 90 | 110 | 115 | 100 | 80 | 120 | 260 |
| Curing conditions Temperature (°C.) | 180 | 180 | 180 | 180 | 180 | 170 | 250 |
| Curing conditions Time (min.) | 40 | 60 | 60 | 60 | 40 | 60 | 1440 |
| Temp. at beginning of weight decrease (°C.) | 400 | 405 | 400 | 405 | 405 | 340 | 405 |
| Loss on heating at 500°C. (%) | 25 | 22 | 20 | 25 | 20 | 65 | 20 |
| Flexural strength* (%) 100°C. | 100 | 100 | 100 | 100 | 100 | 70 | 100 |
| 150°C. | 92 | 95 | 90 | 90 | 92 | 45 | 95 |
| 180°C. | 85 | 85 | 80 | 85 | 83 | — | 90 |
| 250°C. | 63 | 62 | 60 | 65 | 62 | — | 70 |
| Flexural strength after degradation* (%) 500 hrs. | 100 | 100 | 100 | 100 | 100 | — | 85 |
| 1000 hrs. | 90 | 95 | 95 | 93 | 95 | — | 70 |
| 1500 hrs. | 75 | 80 | 75 | 82 | 80 | — | 70 |
| 2000 hrs. | 65 | 70 | 67 | 72 | 70 | — | 65 |
| Oxygen index* (%) | 65 | 68 | 70 | 68 | 68 | 50 | 100 |
| Water absorption in boiling water* (%) | 0.23 | 0.22 | 0.22 | 0.23 | 0.24 | 0.23 | 0.65 |

Note:
same as in Table 3.

As is apparent from Table 4, the present resin compositions are comparable in characteristic properties and superior in curing characteristics to an imide-type resin.

What is claimed is:

1. A thermosetting resin composition comprising an epoxy resin having more than one vicinal epoxy group in the molecule, an N,N'-bismaleic amic acid imide represented by the general formula,

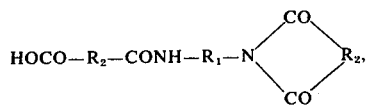

wherein $R_1$ is a divalent group having 2 to 30 carbon atoms and $R_2$ is a divalent group having a carbon-to-carbon double bond and containing two carbon atoms, and an unsaturated bismaleimide represented by the general formula,

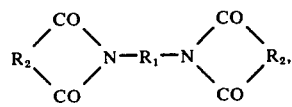

where $R_1$ and $R_2$ have the same meanings as defined above.

4. A thermosetting resin composition comprising an epoxy resin having more than one vicinal epoxy group in the molecule, an N,N'-bismaleic amic acid represented by the general formula,

HOCO—$R_2$—CONH—$R_1$—NHCO—$R_2$—COOH, where $R_1$ is a divalent group having 2 to 30 carbon atoms and $R_2$ is a divalent group having a carbon-to-carbon double bond and containing two carbon atoms, and an unsaturated bismaleimide represented by the general formula,

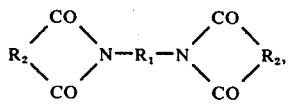

wherein $R_1$ and $R_2$ have the same meanings as defined above.

5. A thermosetting resin composition according to claim 3, which further comprises a polycarboxylic anhydride as a curing agent.

6. A thermosetting resin composition according to claim 4, which further comprises a polycarboxylic anhydride as a curing agent.

7. A thermosetting resin composition according to claim 1, which further comprises an amine compound as a curing agent.

8. A thermosetting resin composition according to claim 3, which further comprises an amine compound as a curing agent.

9. A thermosetting resin composition according to claim 4, which further comprises an amine compound of the general formula,

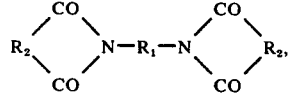

wherein $R_1$ and $R_2$ have the same meanings as defined above.

10. An article obtained by curing the composition of claim 1.

11. An article obtained by curing the composition of claim 3.

12. An article obtained by curing the composition of claim 5.

13. An article obtained by curing the composition of claim 8.

14. A thermosetting resin composition according to claim 1, wherein said composition contains 30 to 200 parts by weight of said N,N'-bismaleic amic acid per 100 parts by weight of said epoxy resin.

15. A thermosetting resin composition according to claim 3, wherein said composition contains 30 to 200 parts by weight of said N,N'-bismaleic amic acid per 100 parts by weight of said epoxy resin.

16. A thermosetting resin composition according to claim 4, wherein said composition contains 30 to 200 parts by weight of said N,N'-bismaleic amic acid per 100 parts by weight of said epoxy resin.

17. The article of claim 10, wherein said composition is cured at at least 180°C.

18. The article of claim 11, wherein said composition is cured at at least 180°C.

19. An article comprising the cured reaction product obtained by curing a thermosetting resin composition at a temperature of at least 180°C, said thermosetting resin composition comprising (a) an epoxy resin having more than one vicinal epoxy group in the molecule, (b) at least one N,N'-bismaleic amic acid represented by the general formula HOCO—$R_2$—CONH—$R_1$—Y, wherein Y is selected from the group consisting of

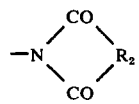

and —NHCO—$R_2$—COOH, wherein $R_1$ is a divalent group having 2 to 30 carbon atoms and $R_2$ is a divalent group having a carbon-to-carbon double bond and containing two carbon atoms, and (c) an unsaturated bismaleimide represented by the general formula,

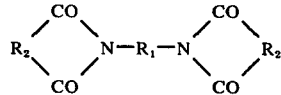

wherein $R_1$ and $R_2$ have the same meanings as defined above.

20. The article of claim 19, wherein said thermosetting resin composition further comprises a polycarboxylic acid anhydride as a curing agent.

21. The article of claim 12, wherein said composition is cured at at least 180°C.

22. The article of claim 13, wherein said composition is cured at at least 180°C.

* * * * *